United States Patent [19]
Peot et al.

[11] Patent Number: 5,856,715
[45] Date of Patent: Jan. 5, 1999

[54] PORTABLE ELECTRICAL POWER TOOL HAVING A RARE EARTH PERMANENT MAGNET MOTOR

[75] Inventors: David G. Peot, Easley; Paul W. Niemela, Pickens, both of S.C.; John E. Nemazi, Bloomfield Hills, Mich.

[73] Assignee: Ryobi North America, Inc., Anderson, S.C.

[21] Appl. No.: 766,747

[22] Filed: Dec. 13, 1996

[51] Int. Cl.⁶ .................................................. H02K 7/14
[52] U.S. Cl. .............................. 310/50; 310/90; 30/388; 30/389
[58] Field of Search ................ 310/90, 50; 30/388, 30/389

[56] References Cited

U.S. PATENT DOCUMENTS

| | | | |
|---|---|---|---|
| D. 282,236 | 1/1986 | Shohoji et al. | D8/61 |
| D. 295,824 | 5/1988 | Hoshino et al. | D8/62 |
| D. 303,206 | 9/1989 | Yother et al. | D8/62 |
| D. 305,606 | 1/1990 | Cavedo | D8/61 |
| D. 315,854 | 4/1991 | Kawakami et al. | D8/66 |
| D. 363,656 | 10/1995 | Gierke | D8/66 |
| 1,531,930 | 3/1925 | Harrison | 30/373 |
| 3,253,624 | 5/1966 | Fegan et al. | 30/475 |
| 3,407,857 | 10/1968 | Bentley | 30/475 |
| 4,221,051 | 9/1980 | Glass | 30/377 |
| 4,334,390 | 6/1982 | Sumerau | 45/355 |
| 4,574,531 | 3/1986 | McCurry | 51/170 EB |
| 4,693,648 | 9/1987 | Cavedo | 409/178 |
| 4,802,931 | 2/1989 | Croat | 148/302 |
| 4,851,058 | 7/1989 | Croat | 148/308 |
| 4,954,739 | 9/1990 | Schultz et al. | 310/156 |
| 5,174,362 | 12/1992 | Croat | 164/463 |
| 5,178,692 | 1/1993 | Panchanathan | 148/101 |
| 5,561,907 | 10/1996 | Cambell et al. | 30/371 |

OTHER PUBLICATIONS

"Electric Machinery and Transformers", second edition, by Bhag S. Guru, Husein R. Hiziroglu, 1995.

*Primary Examiner*—Thomas M. Dougherty
*Assistant Examiner*—Timothy A. Williams
*Attorney, Agent, or Firm*—Brooks & Kushman P.C.

[57] ABSTRACT

A power tool is provided having a housing with a handle for an operator, a rare earth permanent magnet motor oriented within the housing having a rotary output portion operatively driving an implement. The motor has a relatively high horsepower output for its size enabling the location of the motor relative to the implement and the handle to be functionally and ergonomically optimized.

6 Claims, 6 Drawing Sheets

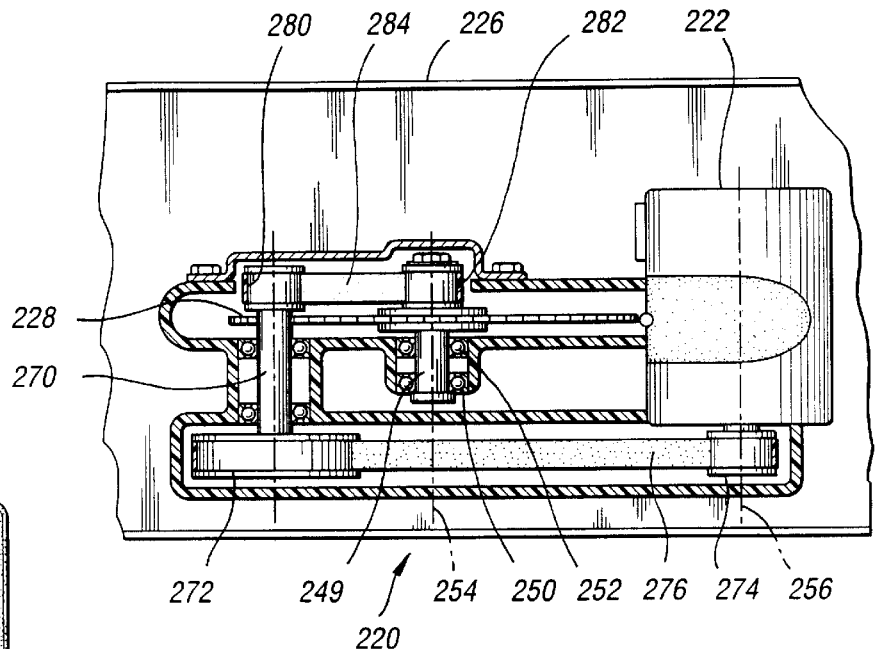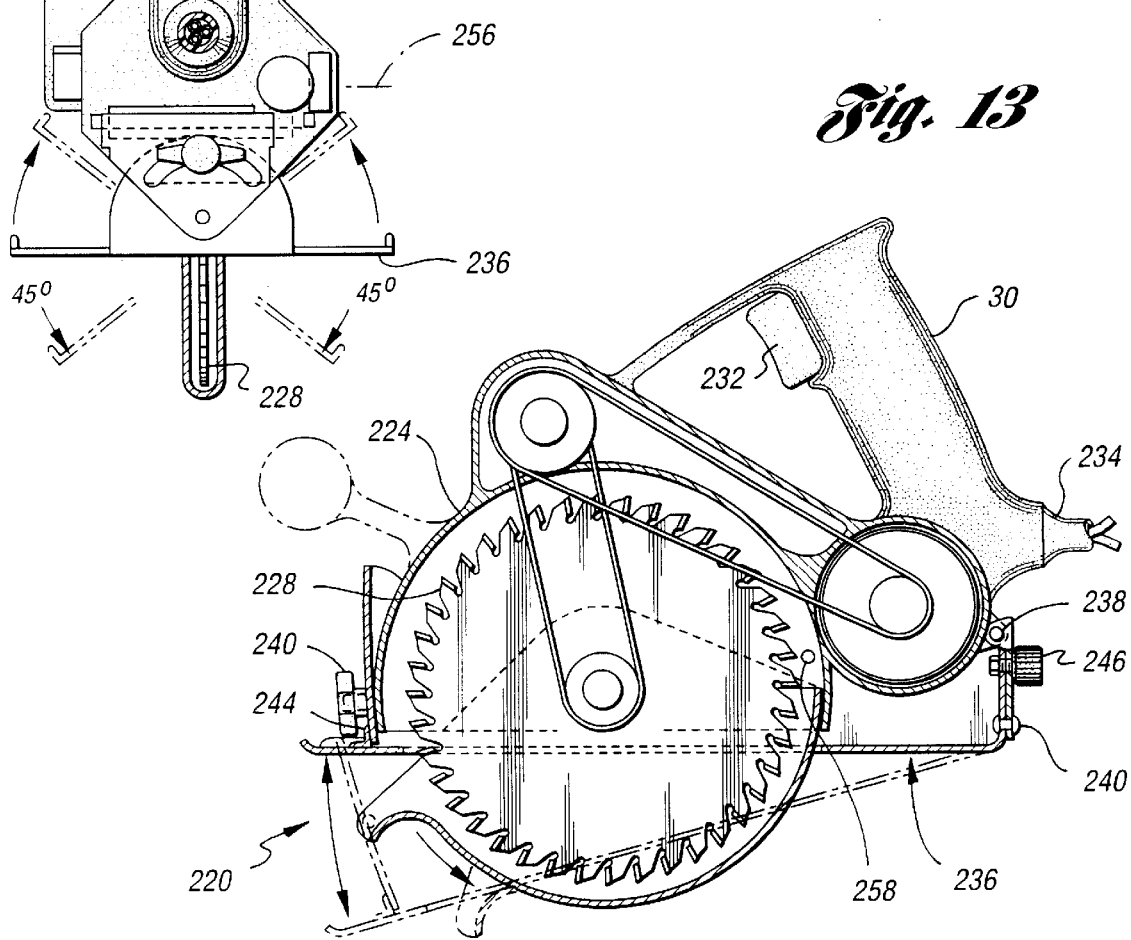

# PORTABLE ELECTRICAL POWER TOOL HAVING A RARE EARTH PERMANENT MAGNET MOTOR

TECHNICAL FIELD

This invention relates to portable power tools having permanent magnet motors.

BACKGROUND ART

Portable electric power tools are typically made by using universal motors or in the case of battery power tools, permanent magnet motors. The electric motor of a power tool is typically very substantial in size and accounts for a significant portion of the power tool's total weight. The size of the motor additionally dictates the layout and orientation of the motor relative to the power driven implement which in turn, dictates the location of the handles enabling the user to grasp the power tool. The following patents are representative and illustrate prior art power tools: U.S. Des. 295,824, Des. 282,236, U.S. Pat. No. 4,574,531, U.S. Pat. No. 4,221,051 and U.S. Des. 315,854.

SUMMARY OF THE INVENTION

It is thus an object of the present invention to provide a portable electric power tool having a miniature high power lightweight permanent magnet electric motor.

It is a further object of the present invention to provide a permanent magnet electric motor for a power tool which is sufficiently small to optimize a balance of power and to locate the handles relative to the driven implement for maximum performance.

In carrying out the above objects, the power tool of the present invention is provided with a housing having an internal cavity and a handle to be grasped by an operator. A permanent magnet electric motor is mounted within the housing internal cavity and is provided with a rotary output portion for operatively driving an implement. The motor assembly is made up of a cylindrical motor shell with at least two permanent magnets affixed to the motor shell and an armature rotatably positioned relative to the motor shell for driving a driveshaft output portion. The permanent magnets are formed of a rare earth material resulting in a high horsepower motor that operates at a high energy product with a very compact axial length and diameter. This enables the location of the center of gravity of the power tool to be conveniently located relative to the handle and a working surface of the implement.

BRIEF DESCRIPTION OF THE DRAWINGS

FIG. 13 is a side elevational view of an alternative circular saw embodiment made in accordance with the present invention;

FIG. 14 is a fragmentary top plan view of the circular saw of FIG. 13; and FIG. 15 is a rear view of the circular saw of FIG. 13.

BEST MODE FOR CARRYING OUT THE INVENTION

Figure 1:
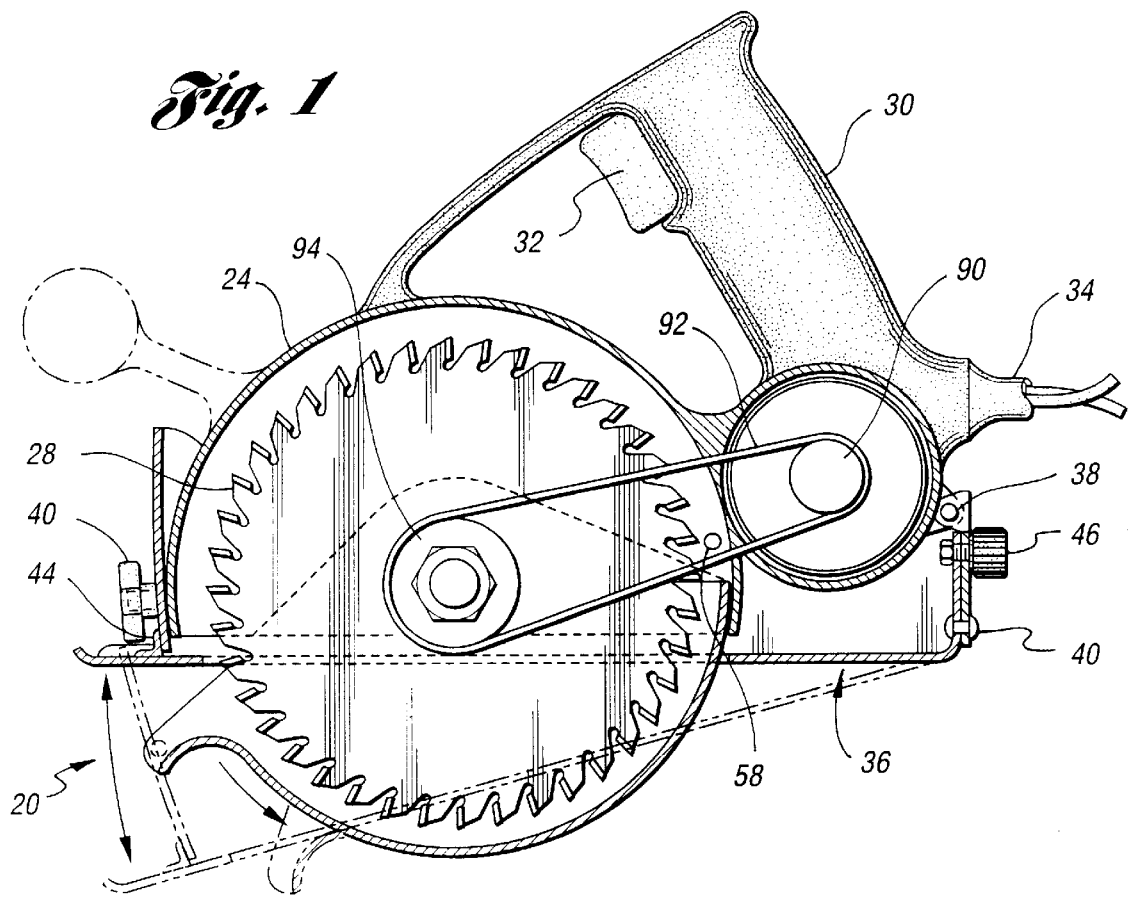
FIG. 1 is a side elevational view of a circular saw made in accordance with the present invention.
Figure 2:
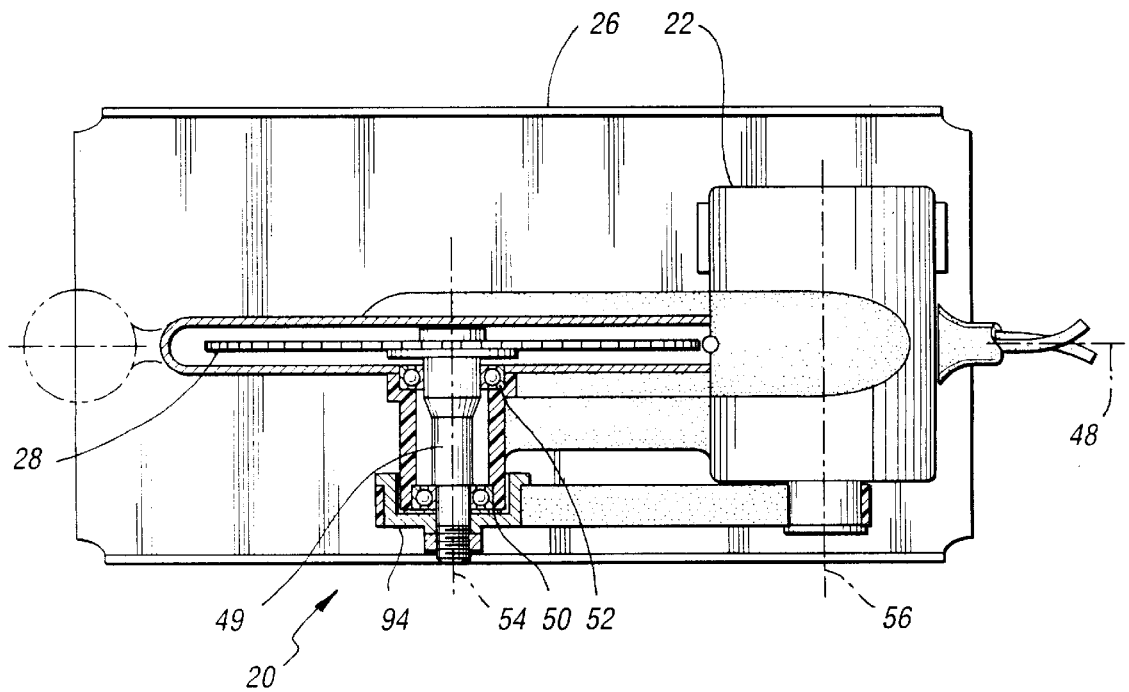
FIG. 2 is a top view of the circular saw of FIG. 1.
Figure 7:
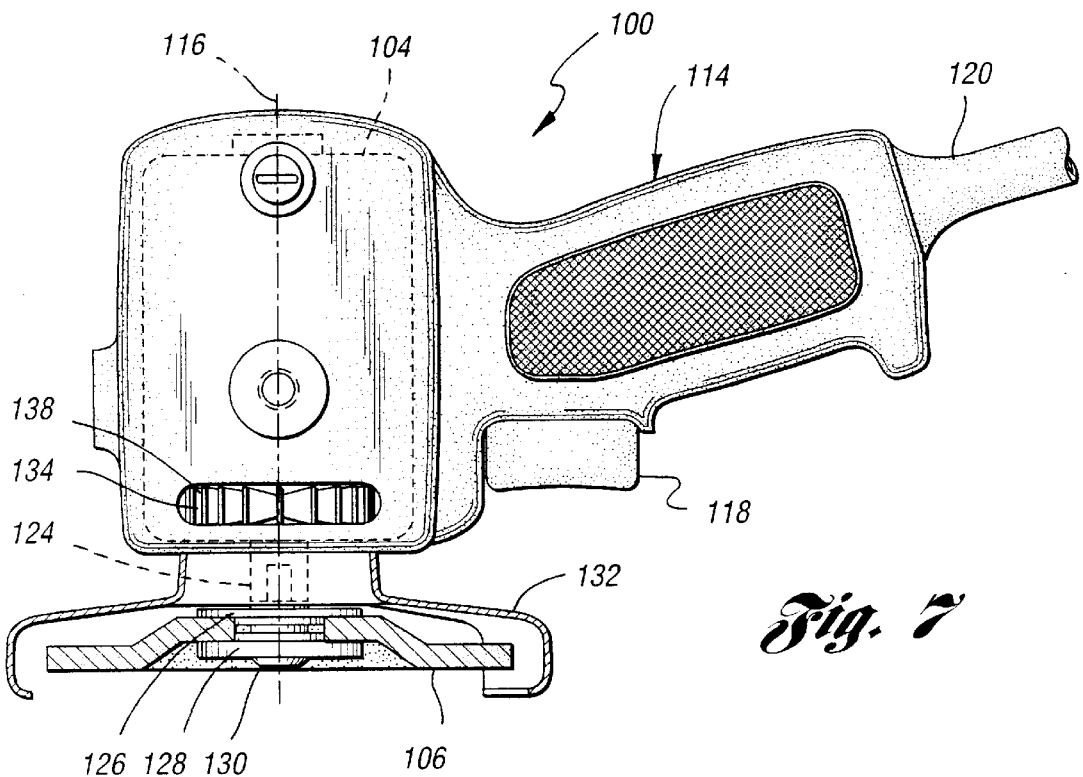
FIG. 7 is a partially cutaway side elevational view of a grinder made in accordance with the present invention.
Figure 8:
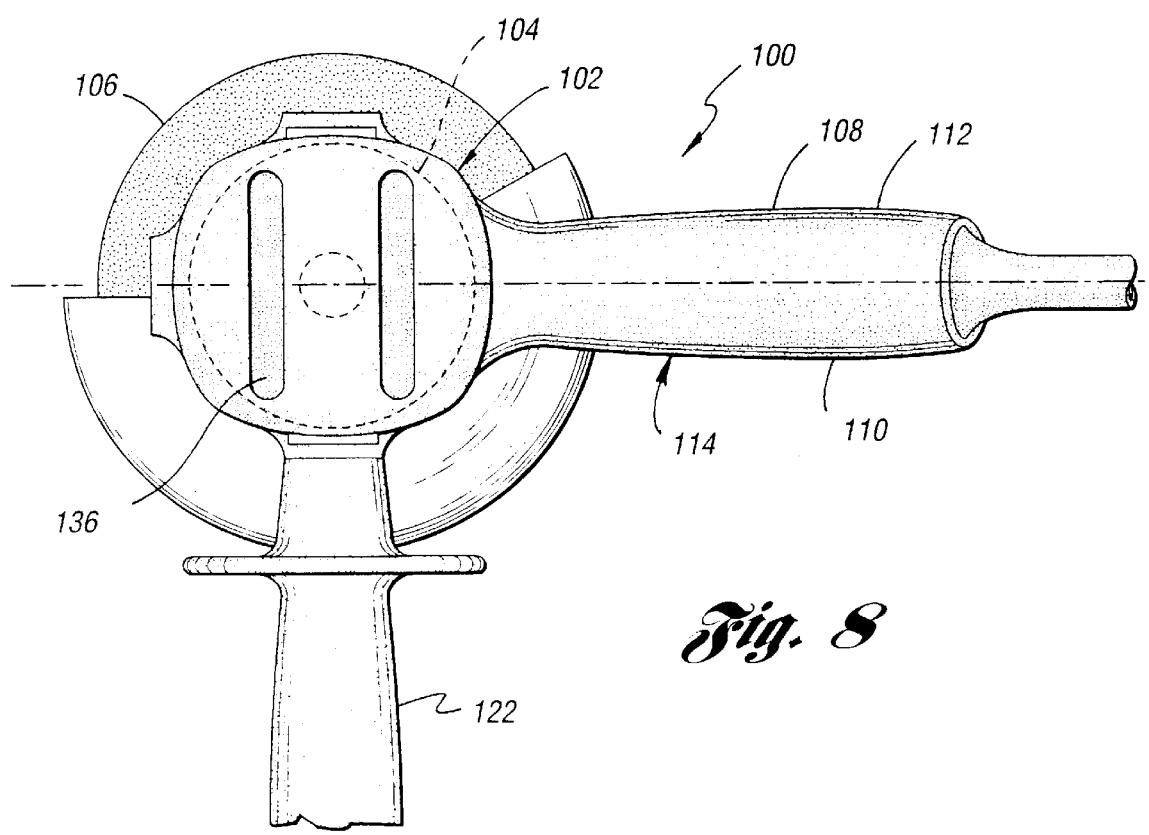
FIG. 8 is a top plan view of the grinder of FIG. 7.
Figure 9:
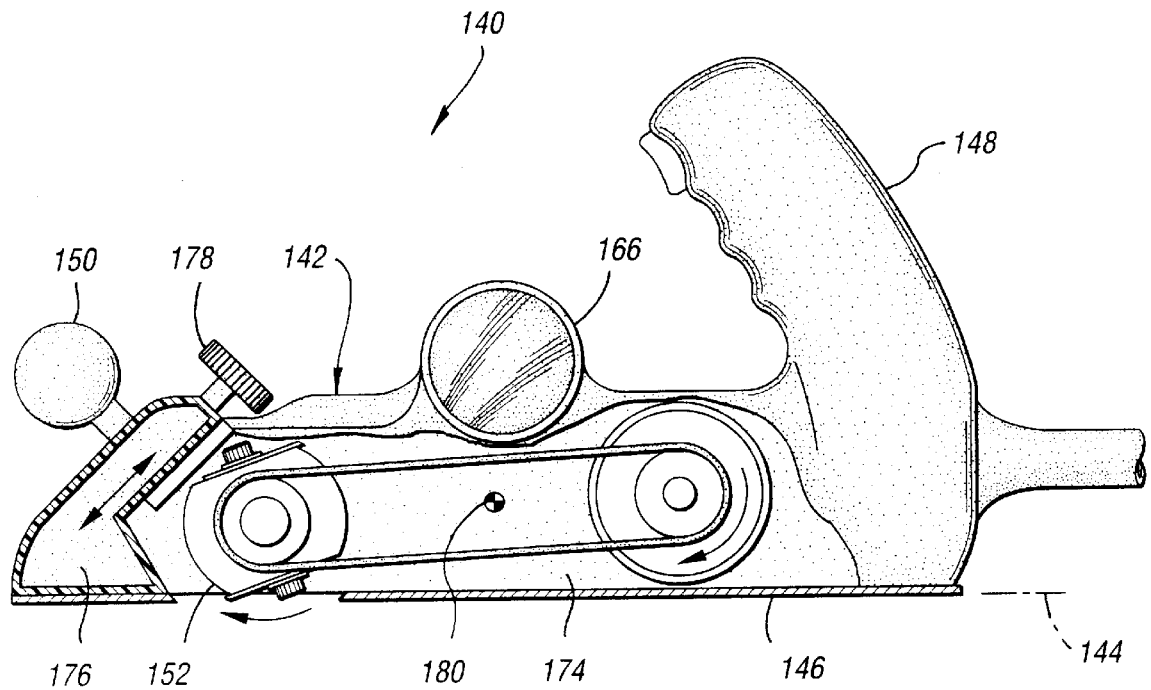
FIG. 9 is a schematic side view of an electric planer made in accordance with the present invention.
Figure 10:
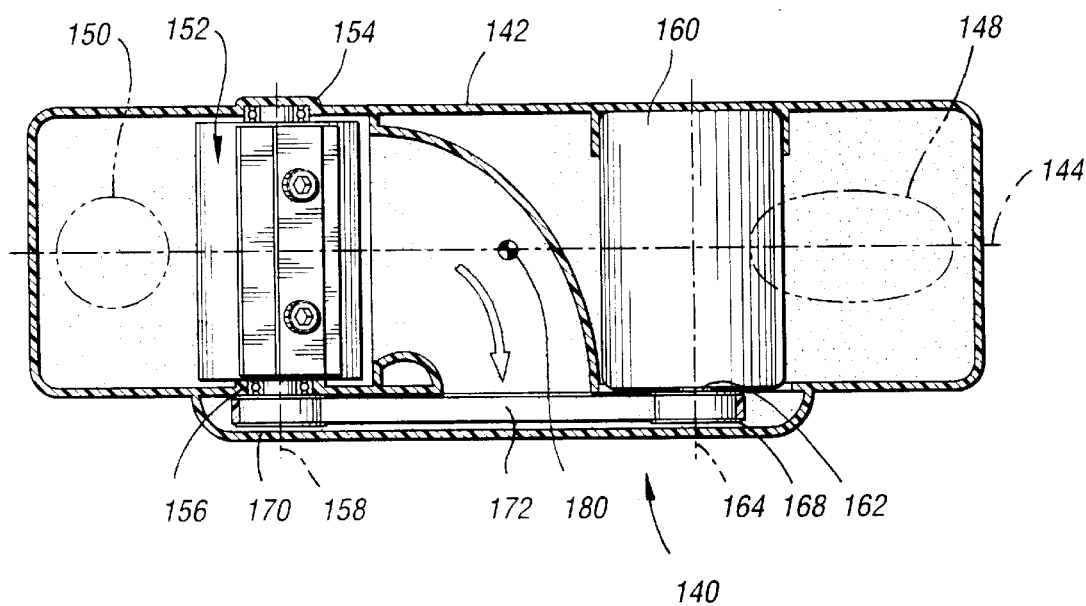
FIG. 10 is a schematic top plan view of the planer of FIG. 9.
Figure 11:
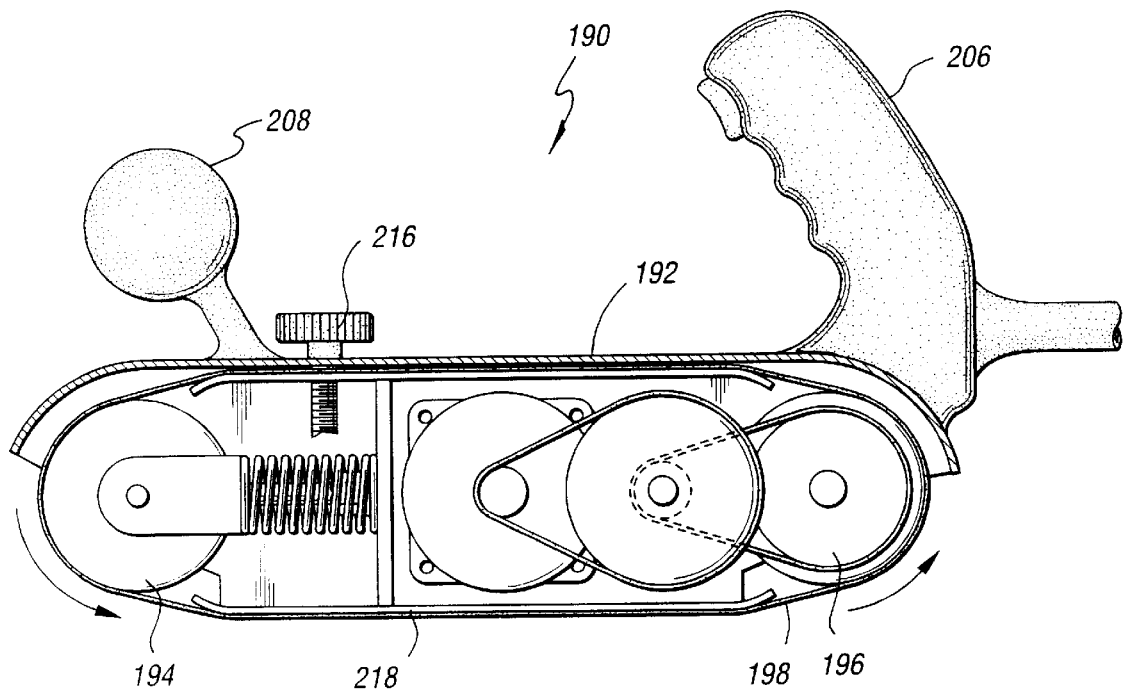
FIG. 11 is a schematic side view of a belt sander made in accordance with the present invention.
Figure 12:
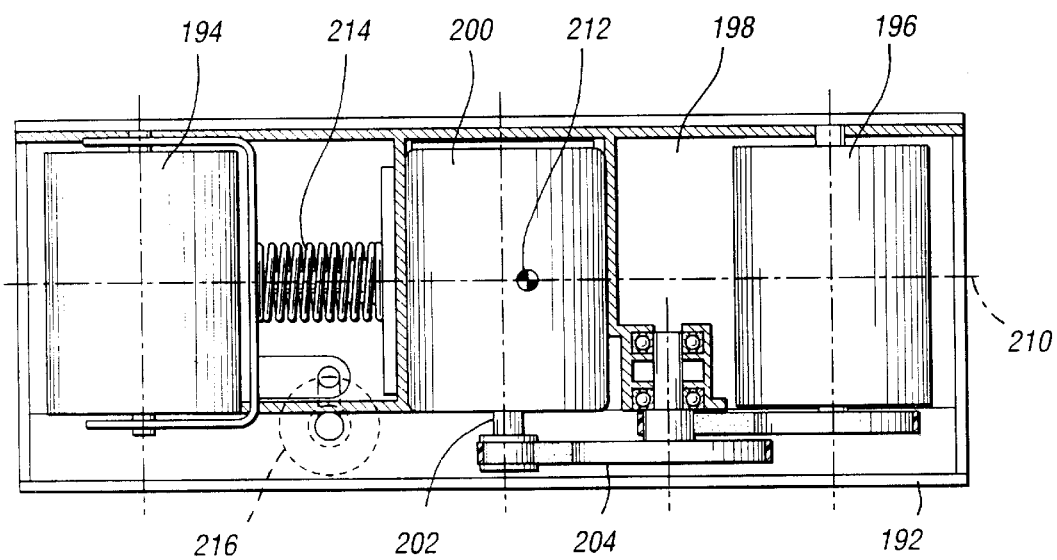
FIG. 12 is a schematic top plan view of the belt sander of FIG. 11.

Several different embodiments of a power tool of the present invention are illustrated in the present application. FIGS. 1–2 illustrate a circular saw 20, FIGS. 7 and 8 illustrate a portable electric grinder 100, FIGS. 9 and 10 illustrate a portable electric planer 140, FIGS. 11 and 12 illustrate a portable electric belt sander 190, and FIGS. 13–15 illustrate an alternative circular saw embodiment 220.

Figure 4:
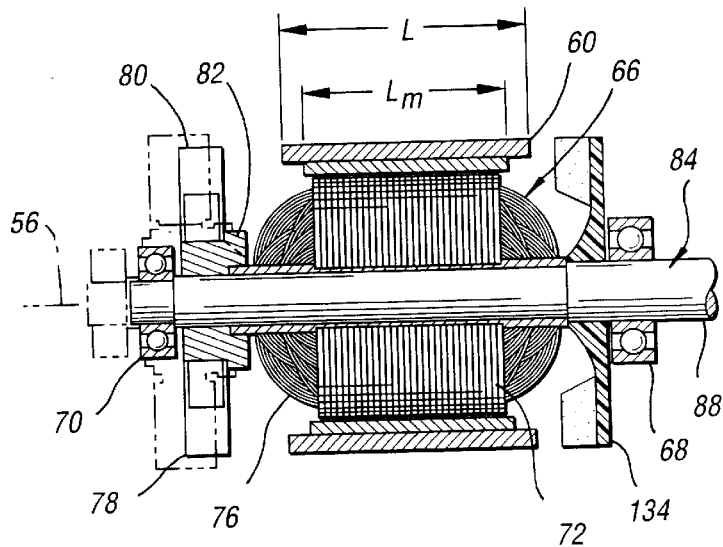
FIG. 4 is a partially cutaway side elevational view of an electric motor.
Figure 5:
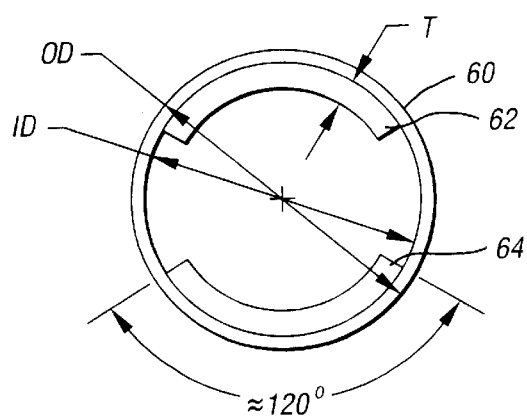
FIG. 5 is a cross-sectional axial end view of a motor shell and magnet assembly.
Figure 6:
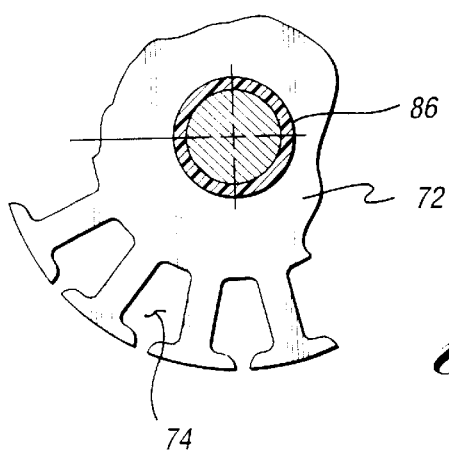
FIG. 6 is a fragmentary view of a motor armature laminate.

Common to these embodiments of the invention is a permanent magnet electric motor 22, an embodiment which is illustrated in better detail in FIGS. 4–6. Electric motor 22 is very compact in size relative to its power output thereby enabling the power tools illustrated to be dramatically reconfigured in order to optimize functional and ergonomic performance of the respective power tool.

Figure 3:
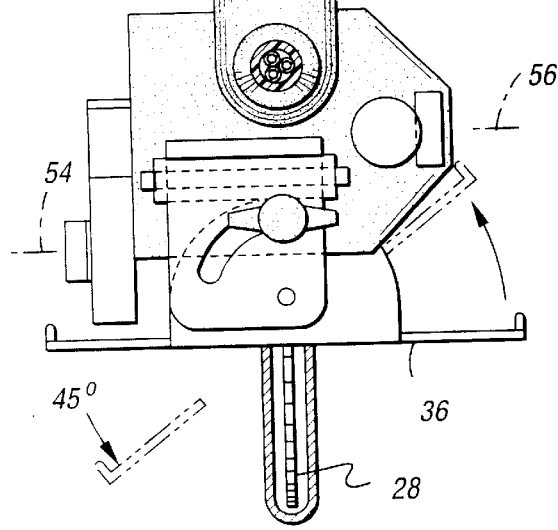
FIG. 3 is a rear view of the circular saw of FIG. 1.

With reference to FIGS. 1–3, circular saw 20 is made up of four main components, electric motor 22, a housing 24, a base plate 26 and a circular saw blade 28. Housing 24 is provided with a handle portion 30 to enable an operator to grasp the circular saw during use. Handle 30 is further provided with a trigger 32 connected to an internal on/off switch enabling the user to selectively activate and deactivate motor 22. A traditional power cord 34 extends from the housing 24 in connection to a suitable power source such as a 110-volt AC wall outlet. A rectifier circuit not shown is oriented within the handle to transform the AC power input to a DC electrical power source for motor 22.

Base plate 26 is provided with a planar surface 36 for engagement with a work piece, not shown. Base plate 26 is adjustably positionable relative to housing 24. Depth of cut pivot pin 38 serves to allow the housing 24 and associated saw blade 28 to be raised and lowered relative to base plate 26. Lock mechanism 40 enables housing 24 to be affixed at base plate 26 once the proper depth of cut has been established. Pivot pins 42 and 44 and associated angle adjustment locking mechanism 46 allow the base plate to be inclined about a longitudinal axis 48 to enable the angle of cut to be varied from the position illustrated in FIG. 3 where saw blade 28 is perpendicular to planar surface 36 to the position shown in phantom outline where the saw blade 20 is inclined 45° relative to planar surface 36 of base plate 26. Of course, locking mechanism 46 can allow the user to position the base plate 36 at any position intermediate the perpendicular orientation illustrated and the 45° angle orientation shown in phantom outline.

Saw blade 28 is affixed to spindle 49 which is pivotally supported relative to housing 24 by a pair of roller bearings 50 and 52. Spindle 49 is aligned along a spindle axis 54 which is perpendicular to the longitudinal axis 48 in the FIG. 2 plan view. When base plate 26 is oriented perpendicular to the plane of saw blade 28, spindle axis 54 is perpendicular to planar surface 36. Motor 22 is provided with a motor axis 56 which is parallel to and rearwardly spaced relative to spindle axis 54.

Due to the small compact size of motor 22, the motor can be positioned adjacent the outer periphery of saw blade 28 with the distance between the spindle axis 54 and the motor axis 56 being significantly less than the diameter of the saw blade. Preferably, the distance between the spindle axis and motor axis will be between 70% and 90% and most preferably about 80% of the diameter. The small size of motor 22 allows the overall height of circular saw 20 to be minimized.

Handle 30 is conveniently located above center of gravity 58 as illustrated in FIG. 1. Preferably, the uppermost portion of motor 22 is at or below the uppermost portion of saw blade 28 when base plate 28 is positioned at the maximum depth of cut orientation shown in FIG. 1. This motor location enables handle 30 to be ergonomically located relative to center of gravity 58 while providing adequate clearance between motor 22 and base plate 28 to allow the base plate to pivot about pivot pins 42 and 44 as illustrated in phantom outline in FIG. 3.

Due to the small compact size of motor 22, it is also possible to orient the handle 30 and the center of gravity 58 of the circular saw 20 proximate the plane of the circular saw blade as illustrated in FIG. 2 thereby giving this saw a balanced feel when not engaged with the work piece. Force exerted on the circular saw 20 either by the saw blade 28 or by the user engaging the handle 30 are directly inline. This minimizes skewing of the saw blade 28 in relation to the slot formed in the workpiece thereby improving both the quality of the cut and reducing blade binding. This is a significant improvement from traditional circular saws where the motor is substantially offset to one side of the saw blade.

Preferably, motor 22 of circular saw 20 has a horsepower output of at least 1 hp and most preferably at least 1.5 hp. In order to achieve a high horsepower output in a relatively small size motor, motor 22 is a permanent magnet DC motor formed using very high strength rare earth magnets. A representative motor construction is shown in FIGS. 4–6. Motor 22 is made up of a generally cylindrical shell 60 having a length L which is less than 3 ½ inches and most preferably between 1.8 and 2½ inches. Cylindrical motor shell 60 has a diameter of less than 3 inches and preferably between 2.25 and 2.75 inches. Motor shell 60 has a wall thickness which is relatively thick so as not to become magnetically saturated. Preferably, the wall thickness of shell 60 is between 0.100 and 0.150 inches thick and most preferably about 0.125 inches. Shell 60 can be of traditional construction rolled from a generally rectangular preform or of the type shown in U.S. Pat. No. 5,160,867 which is incorporated by reference herein.

A pair of permanent magnets 62 and 64 in the shape of semi-cylindrical segments are affixed to the inside diameter of cylindrical shell 60. In the embodiment illustrated, each of the magnets has a circumferential length of approximately 120° providing significant air gaps between the adjacent circumferential ends of the magnets. Permanent magnets 62 and 64 are formed of a high strength rare earth material such as neodymium, praseodymium, samarium or a rare earth-iron alloy such as the neodymium-iron-boron powder alloy described in U.S. Pat. Nos. 5,352,301, 5,178,692, 5,174,362, 4,851,058 and 4,802,931 which are owned by General Motors Corporation and are incorporated by reference herein to illustrate one of several suitable high strength rare earth magnet materials.

Of course, rather than using a neodymium-iron-boron alloy magnet, a high neodymium content material can be used. However, alloys having very high neodymium content, which have excellent magnetic property, are more expensive than neodymium-iron alloys. It is believed that a magnet operating at an energy product of at least 10 mega-gauss-oersteds is sufficient to practice the invention. However, the higher the maximum energy product of the magnet, the more compact the motor can be made for a given horsepower rating while operating at a sufficient energy product.

For example, a neodymium-iron-boron magnet having a residual flux density of at least 6000 gauss (0.6 tesla), and a coercive force of at least 8000 oersteds (637 kilo-ampere-turns/meter) is operable at energy products above 10 mega-gauss-oersteds.

In the preferred embodiment, magnets 62 and 64 have an axial length $L_m$ which is approximately 80% of the shell length L. Magnets 62 and 64 have a radial thickness T, shown in FIG. 5, of between 0.100 and 0.200 inches most preferably about 0.150 inches.

Armature assembly 66 is aligned along motor axis 56 and is rotatably supported relative to shell 60 on a pair of conventional roller bearings 68 and 70 illustrated in FIG. 4. Armature 66 includes a laminate stack 72 having a series of slots formed therein about which a series of coils are wound in a conventional manner. A portion of a laminate stack 72 is shown in FIG. 6. The laminate stack 72 is provided with fourteen circumferentially aligned slots 74 through which seven coils are wound. Each of the coils collectively shown as coil winding 76 in FIG. 4 and is formed of approximately forty turns of 26 gauge magnet wire resulting in a motor generating approximately 1 hp when run with a 110-volt power supply at approximately 12000 rpm. Of course, the size and configuration of motor 22 can be altered to suit the particular application. For example, the number of coils for motor 22 may be fourteen, or any multiple of seven depending on desired operating parameters for the motor.

The power is supplied to armature 66 in a conventional manner using a pair of brushes 78 and 80 which electrically communicate with rotating commutator assembly 82 which in turn are electrically connected to the armature coils. Armature assembly 66 further includes a driveshaft 84 which extends through the laminate stack 72 as illustrated in FIGS. 4 and 6. Driveshaft 84 is electrically isolated from laminate stack 72 by a molded plastic insulator 86. Driveshaft 84 is further provided with a drive portion 88 for operatively driving the power tool.

In the circular saw embodiment illustrated with reference to FIGS. 1–3, driveshaft output portion 88 is connected to a drive pulley 90 which drives a belt 92 which in turn rotates a driven pulley 94 connected to spindle 49. Due to the high speed of the motor and in the embodiment illustrated, the six inch diameter of the saw blade, the drive ratio between the motor pulley 90 and driven pulley 94 is 3 to 1 causing the saw blade to rotate at 4000 rpm when a motor is turning at 12000 rpm. Of course, if the diameter of saw blade 28 is greater, the drive ratio will be appropriately reduced to maintain the desired surface feet per minute at the cutting surface of the saw blade periphery.

A portable electric grinder 100 shown in FIGS. 7 and 8 illustrate an alternative embodiment of a power tool utilizing the present invention. Portable electric grinder 100 is made up of a housing 102, a permanent magnet electric motor 104 oriented within housing 102 and an abrasive disk 106. Housing 102 is preferably formed of a pair of molded plastic sections 108 and 110 joined along longitudinal axis 112. Housing 102 defines an internal cavity sized to receive a motor 104 and has a primary handle 114 extending away from motor 104 aligned with longitudinal axis 112. Primary handle 114 extends generally radially from motor axis 116 shown in FIG. 7. Trigger 118 is positioned on the lower portion of primary handle 114 and cooperates with an on/off power switch not shown which is housed within primary handle 114. Power cord 120 preferably extends from an end of primary handle 114 opposite motor 104 and is attached to a conventional source of electric power such as 110-volt AC outlet. Also located within primary handle 114 is a conventional rectifier circuit which generates a DC power supply for motor 104.

Housing 102 is also preferably provided with an auxiliary handle 122 which may be removably attached to housing 102 at several different locations to accommodate both right and left-handed users.

Unlike traditional portable electric grinders, grinder 100 has motor 104 aligned vertically concentric with abrasive disk 106. Motor 104 is provided with a drive shaft having a rotary output portion 124 to which abrasive disk 106 is directly attached using a pair of mounting washers 126 and 128 and an attachment screw 130 which threadingly cooperates with drive shaft output portion 124. Preferably, a conventional guard 132 will be mounted to housing 102 and will extend about a portion of the periphery of disk 106 as illustrated.

In the preferred embodiment, motor 104 will have a horsepower rate of 0.7 to 2 horsepower and most preferably, in the 1 to 1½ horsepower range. The motor free speed is preferably between 5,000 and 15,000 rpm and most preferably, between 10,000 and 14,000 rpm. In the embodiment illustrated, the motor of the type shown in FIGS. 4–6 is utilized having a horsepower rating of approximately 1 horsepower and 12,000 rpm free speed.

As illustrated in FIGS. 7 and 8, the portable electric grinder 100 is quite small and compact having similar performance characteristics previously achievable only in pneumatic grinders. Preferably, abrasive disk 106 has a diameter which is significantly greater than the diameter of motor 104 so that the operator can easily view the outer peripheral edge of abrasive disk 106 and plan view (FIG. 8) when the tool is in use. In the preferred embodiment of the invention illustrated in FIGS. 7 and 8, abrasive disk 106 has a diameter of approximately 4½" while motor 104 has a diameter of 2½".

Preferably, motor 104 will have a shell diameter of less than 3" and a shell length of less than 3". In the embodiment of the invention illustrated, motor 104 has a shell axial length of 2" resulting in a very low profile grinder which is not much higher than a conventional right angle grinder (U.S. Des. 295,824), where the motor is mounted radially outboard of the axis of rotation of the abrasive disk. In order to cool motor 104 during operation, the motor is provided with a cooling fan 134 and housing 102 is provided with an air inlet 136 and an air outlet 138 to draw air through housing 102 across motor 104.

An alternative embodiment of the invention is illustrated in FIGS. 9 and 10 in the form of a portable electric planer 140. Planer 140 is provided with a housing 142 aligned along longitudinal axis 144. Housing 142 has a planar base surface 146 for engaging a work piece not shown. Preferably, housing 142 is provided with a pair of handles, rear handle 148 and front handle 150 which are longitudinally spaced apart and are located in plan view along longitudinal axis 144. Planer 140 is provided with a rotary cutter assembly 152 which is pivotally supported on housing 142 on a pair of bearings 154 and 156 for rotation about a cutter axis 158 which is perpendicular in plan view to longitudinal axis 144. Permanent magnet electric motor 160 is affixed to housing 144 spaced from and oriented parallel to cutter assembly 152. Motor 160 is provided with a rotary output shaft 162 which is rotatable about a motor axis 164 which is parallel to cutter axis 158 and perpendicular in plan view to longitudinal axis 144. Motor axis 164 is spaced sufficiently from cutter axis 158 to achieve a good weight distribution and a central center of gravity and to provide adequate clearance for dust collection outlet chute 166.

In the preferred embodiment, motor output shaft 162 is operatively connected to the rotary cutter assembly 152 by drive pulley 168 affixed to output shaft 162. Driven pulley 170 is affixed to cutter assembly 152. Belt 172 operatively connects drive pulley 168 to driven pulley 170 as illustrated in FIG. 9. Belt 172 which can be of a flat, V or a cog variety. Alternatively, motor 160 can be operatively connected to cutter assembly 152 utilizing a drive chain or a gear set.

Preferably, housing 142 is made up of two portions; a main portion 174 and a lower portion 176. Lower portion 176 is adjustably positionable relative to the main portion 174 using a conventional adjustment mechanism 178 to vary the depth of cut of cutter assembly 152 into the work piece to be planed.

The small contact size of motor 160 allows the overall width of planer 140 to be greatly minimized in comparison to a traditional planer of the type illustrated in U.S. Des. 282,236 and Des. 305,606. The resulting planer has a center of gravity 180 which is located in the approximate center of the planer longitudinal length in close proximity to longitudinal axis 144. This very compact and ergonomically effective design is achievable due to the small diameter and short axial length of motor 160 when contrasted to traditional motors utilized in planers of the prior art. Preferably, motor 160 has a motor shell length of less than 3" and a diameter of less than 3" enabling the motor in the 0.7 to 1.5 horsepower range to be conveniently packaged as generally illustrated in FIGS. 9 and 10. Ideally, the overall length of motor 160 will not be appreciably longer than the overall axial length of cutter assembly 152.

Another alternative embodiment of the invention is shown in FIGS. 11 and 12 which illustrate a portable electric belt sander 190. Belt sander 190 includes a frame 192, a pair of longitudinally spaced apart transversely extending drums 194 and 196 and an endless belt 198 formed of sandpaper. Electric permanent magnet motor 200 is affixed to frame 192 and is oriented between drums 194 and 196 within the interior of endless belt 198. Motor 200 is provided with a rotary output member 202 which operatively drives drum 196 via a gear reduction drive train 204.

In the preferred embodiment illustrated, a two stage belt drive gear reduction mechanism is utilized, however, more or fewer stages can be used. Further, gears can be substituted for belts or used in combination with belts in order to achieve the desired belt speed. In the embodiment illustrated, motor 200 has a free speed of approximately 12,000 rpm. Motor 200 and drums 194 and 196 are approximately 2½" in diameter. In order to achieve a free belt speed between 1,000 and 1,500 surface feet per minute, a gear reduction ratio between about 7.85 to 1 for 1,000 surface feet per minute, and about 5.24 to 1 for 1,500 surface feet per minute is employed between the driveshaft of the motor and the drum 196.

Ideally, motor 200 will have an overall axial length comparable to the axial length of drums 194 and 196 to achieve a very ergonomical, compact and balanced planer with the general configuration illustrated in FIGS. 11 and 12. Ideally, housing 192 is provided with a pair of handles 206 and 208 positioned along longitudinal center line 210 which is aligned along the center of endless belt 198 and drums 194 and 196. This configuration results in center of gravity 212 being located slightly offset from longitudinal center line 210 due to the weight of drive train 204. However, the offset is preferably less than ½" and most preferably, less than ¼" resulting in a negligible reaction torque when the operator holds the planer by the handles off of the work piece.

Belt sander 190 is further provided with a conventional belt tensioning mechanism 214 and a belt alignment mechanism 216 of the type illustrated in U.S. Pat. No. 4,574,531. Sander 190 is additionally provided with other traditional components such as base plate 218 for supporting endless sandpaper belt 198 which is well known to those familiar in the belt sander art.

An alternative circular saw 220 is shown with reference to FIGS. 13–15. Circular saw 220 differs from circular saw 20 described previously with reference to FIGS. 1–3 in that circular saw 220 is designed to tilt 45° in both the right and left directions, as illustrated in FIG. 15. In order to accommodate counterclockwise tilt movement, the driving connection between the motor pulley and the blade is significantly altered.

An intermediate shaft 270 is pivotally supported on the motor housing 224 extending through and perpendicular to the plane of saw blade 228. The intermediate shaft 270 is operatively driven by an input pulley 272 coupled to the motor pulley 274 by a first drive belt 276. On the opposite side of the plane of the blade 228, the intermediate shaft 270 is provided with an output pulley 280 which is operatively connected to a blade pulley 282 by a second drive belt 284. This two belt design enables the axial length of blade spindle 249 to be minimized in both the right and left directions, thereby accommodating both clockwise and counterclockwise tilt adjustment relative to the saw longitudinal centerline. In order to maintain a minimal spindle axial length, the spindle 249 is pivotally supported relative to the housing 224 by a pair of closely spaced bearings 250 and 252 oriented on one side of the blade axis. On the opposite side of the blade axis, blade pulley 282 is a nut pulley combination provided for retaining the blade 228 to the spindle 249 and for providing a pulley surface for cooperatively engaging the second drive belt 284.

If necessary, an appropriate belt tensioner (not shown) is provided for appropriately tensioning and loosening the belt sufficiently to accommodate blade changes. The remaining components making up circular saw 220 are similar in construction to circular saw 20 described previously and like components have been given corresponding 200 series reference numerals, i.e., the handle 230 in FIG. 13 corresponds to handle 30 in FIG. 1.

Having now fully described the invention, it will be apparent to one of ordinary skill in the art that many changes and modifications can be made thereto without departing from the spirit or scope of the invention as set forth herein.

What is claimed is:

1. A portable electric power tool comprising:

a housing including a handle for a user;

an electric permanent magnet motor assembly mounted within the housing, the motor assembly having a cylindrical motor shell aligned along a motor axis, at least two permanent magnets affixed to the motor shell, an armature rotatable within the motor shell and a driveshaft affixed to the armature providing a rotary power output, wherein the permanent magnets are formed of a rare earth material resulting in a power output of at least 0.7 hp for the motor, the motor operating at an energy product of at least 10 megagauss-oersteds with the motor shell having an axial length of less than 3½ inches and a diameter of less than 3 inches; and a rotary driven implement operatively connected to the output of the motor driveshaft, wherein the power tool has a center of gravity which falls proximate a plane defined by the rotary driven implement, the center of gravity falling on a line parallel to the rotary driven implement and aligned with the handle.

2. A portable circular saw comprising:

a housing including a handle for an operator;

a base plate attached to the housing and having a planar surface for engaging a work piece which is adjustably positionable relative to the housing;

an electric permanent magnet motor mounted to the housing, the motor having a cylindrical motor shell, at least two magnets mounted within the motor shell and a rotatable armature having a driveshaft output portion, the motor shell having an axial length of less than 3½ inches and a diameter less than 3½ inches, the magnets being formed of a composition including a substantial amount of rare earth material resulting in a power output of at least 1 hp for the motor, the motor operating at an energy product of at least 10 megagauss-oersteds; and a generally planer circular saw blade pivotally attached to the housing and rotatable driven by the motor, wherein the circular saw has a center of gravity which falls proximate a plane defined by the circular saw blade, the center of gravity falling on a line parallel to the circular saw blade and aligned with the handle.

3. The circular saw of claim 2 wherein the housing has a longitudinal axis parallel to the plane of the circular saw blade, the circular saw further comprising:

an angle of cut adjustment mechanism cooperating with the base plate and housing to allow selective inclined positioning of the base plate planer surface about the longitudinal axis to vary the angle of cut for the circular saw blade relative to the base plate planer surface.

4. The circular saw of claim 3 wherein the angle of cut is variable between a first position wherein the circular saw blade is perpendicular to the base plate planer surface and a second position wherein the circular saw blade is substantially inclined relative to the base plate planer surface.

5. The circular saw of claim 3 wherein the angle of cut is variable between a first position wherein the circular saw blade is substantially inclined toward one side of the base plate planer surface and a second position wherein the circular saw blade is substantially inclined toward the other side of the base plate planer surface.

6. The circular saw of claim 5 further comprising:

an intermediate shaft pivotally supported on the motor housing, the intermediate shaft extending through and perpendicular to the plane of the saw blade;

a first drive mechanism connecting the motor to the intermediate shaft; and a second drive mechanism connecting the intermediate shaft to the circular saw blade.

* * * * *